United States Patent [19]

Taylor et al.

[11] 4,185,836
[45] Jan. 29, 1980

[54] DISC RECORD PLAYER

[75] Inventors: Brian P. Taylor; Khalid O. Chaudry, both of Swindon, England

[73] Assignee: Plessey Handel und Investments AG, Zug, Switzerland

[21] Appl. No.: 915,546

[22] Filed: Jun. 14, 1978

Related U.S. Application Data

[63] Continuation-in-part of Ser. No. 831,169, Sep. 7, 1977, abandoned.

[30] Foreign Application Priority Data

Sep. 9, 1976 [GB] United Kingdom ............ 37322/76
Mar. 19, 1977 [GB] United Kingdom ............ 11746/77

[51] Int. Cl.² .................. G11B 3/10; H02K 41/00
[52] U.S. Cl. .................................. 274/23 A; 310/12
[58] Field of Search ............ 274/9 RA, 23 A, 23 R; 310/27 R, 13, 12

[56] References Cited

U.S. PATENT DOCUMENTS

| | | | |
|---|---|---|---|
| 3,212,074 | 10/1965 | Daniels et al. ............ | 274/9 RA |
| 3,688,035 | 8/1972 | Cless ............ | 310/13 |
| 3,830,505 | 8/1974 | Rabinow ............ | 274/1 R |
| 3,899,699 | 8/1975 | Griffing ............ | 310/27 R |
| 4,046,386 | 9/1977 | Gosling ............ | 274/23 A |
| 4,076,257 | 2/1978 | Ireta ............ | 274/23 A |
| 4,124,216 | 11/1978 | Sorensen ............ | 274/23 A |

FOREIGN PATENT DOCUMENTS 51-1180038 9/1976 Japan.
49-3564 1/1974 Japan.

OTHER PUBLICATIONS

Japanese Open Utility Model Bulletin #49-35202, opened Mar. 28, 1974.

Primary Examiner—Steven L. Stephan
Attorney, Agent, or Firm—Fleit & Jacobson

[57] ABSTRACT

A disc record player including a pick up arm, a linear type electric actuating motor for effecting tangential tracking of the pick up arm and feed back means for providing a motor control feed back signal representative of at least one of velocity and acceleration of the pick up arm.

14 Claims, 9 Drawing Figures

DISC RECORD PLAYER

This invention relates to a disc record player and is a continuation in part of U.S. application Ser. No. 831,169, filed Sept. 7, 1977, now abandoned.

According to this invention there is provided a disc record player including a pick up arm, a linear type electric actuating motor for effecting tangential tracking of the pick up arm and feed back means for providing a motor control feed back signal representative of at least one of velocity and acceleration of the pick up arm.

Preferably, the feed back means provides both velocity and acceleration representative signals which are combined to provide the motor control feed back signal.

The feed back means for providing the motor control feed back signal may comprise electrical position responsive means for providing a signal representative of a position of the pick up arm and differentiation means for differentiating the signal provided by the position responsive means.

In a preferred form, the electrical position responsive means is a wiper movable along a resistive track.

The linear type electric motor may comprise movable coil means for moving along a path adjacent strip magnet means arranged between opposed magnetisable members which are magnetically linked, at least part of the coil means being disposed between the strip magnet means and one of the magnetisable members so that when energised, relative movement between the coil means and the strip magnet means is obtained.

The strip magnet means preferably has similarly poled ends and the coil means includes at least one turn arranged around one of the members.

The strip magnet means may conveniently be provided in the form of a magnetic rubber strip.

In one embodiment of the invention, the coil means is carried by a movable carriage upon which the pick up arm is mounted and the movable carriage may be provided with wheels which run on guide rods.

In a preferred embodiment at least one wheel has a grooved rim which engages a respective guide rod to provide accurate location.

Each wheel may be provided with a central axle which is supported by a pair of bearing members, each having a generally V-shaped cut out position to accomodate the axle.

A preferred embodiment of disc record player in accordance with this invention includes a pick up arm, a linear type electric motor for effecting tangential tracking of the pick up arm, the motor comprising a pair of opposed magnetisable members which are magnetically linked, a strip magnet arranged between the members and carried by one of them, said magnet having opposite ends of the same polarity, coil means provided around one of the opposed members, a wheeled carriage arranged to bridge the pair of members and to carry upon opposite surface portions the coil means and the pick up arm, a pair of wheels mounted on the carriage and having grooved rims arranged to engage a first guide rod positioned to one side of the pair of members, a third wheel mounted on the carriage opposed to the pair of wheels and arranged to run along a second guide rod positioned to a side of the pair of members opposite to the said one side and feed back means for providing a motor control feed back signal representative of at least one of velocity and acceleration of the pick up arm.

Each of the pair of wheels and the said third wheel may have a central axle supported by a pair of bearing members each having a V-shaped cut out portion to accomodate the axle and the feed back means is conveniently provided to include potentiometer means formed by a resistive track positioned substantially parallel to the first and second guide rods and a wiper extending from the carriage to contact the track, the potentiometer means providing a signal representative of the position of the carriage and there is also provided differentiation means for differentiating the said signal.

This invention will now be further described by way of example with reference to FIGS. 1–8 of the accompanying drawings in which.

Figure 7A:
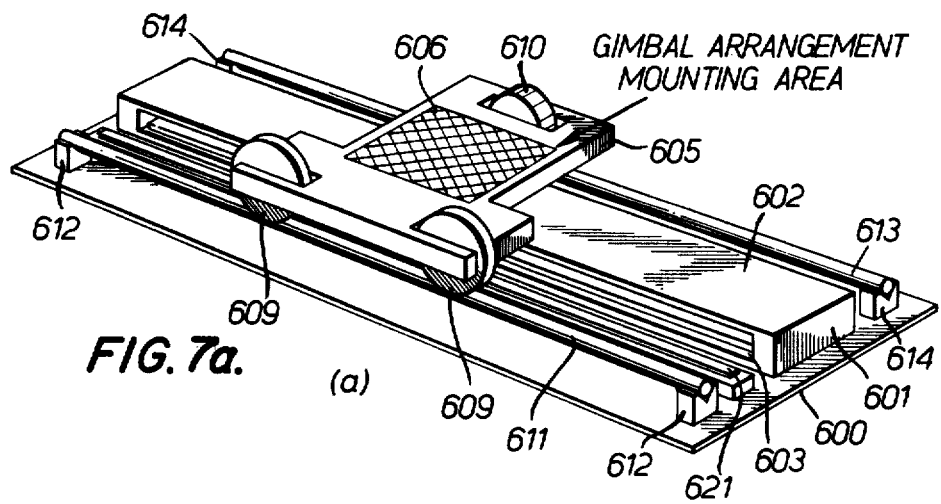
Figure 7B:
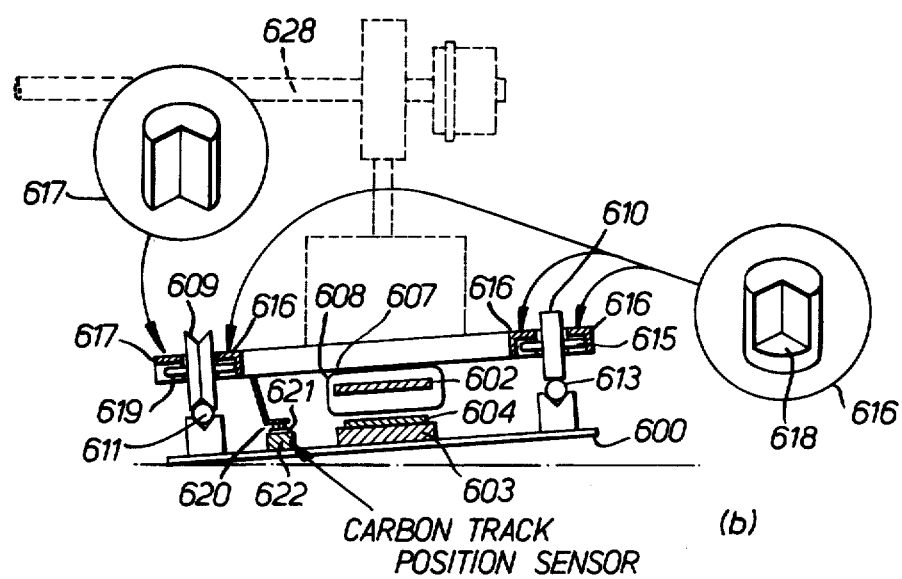
Figure 8:
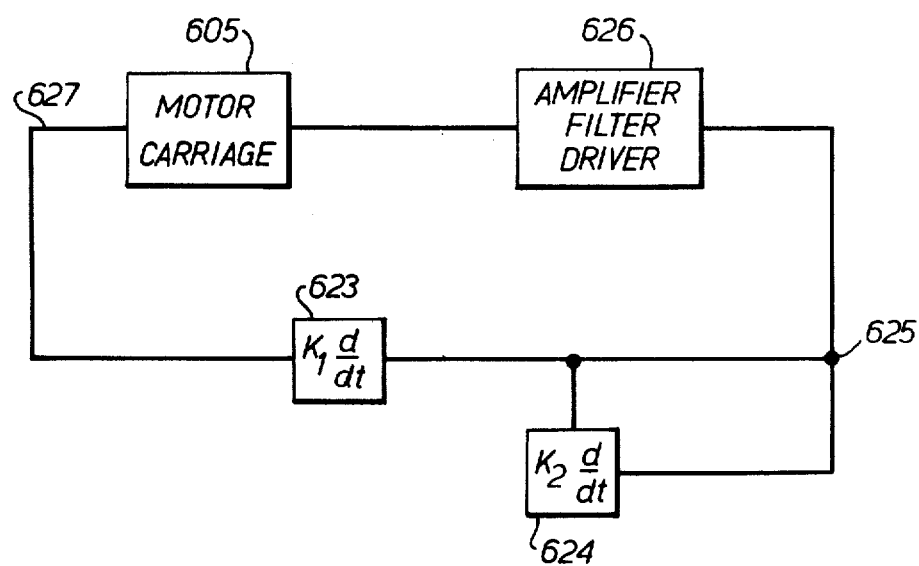

FIG. 7a and b show perspective and side views of a preferred form of electric actuating motor and FIG. 8 shows the motor control arrangement.

Figure 1:
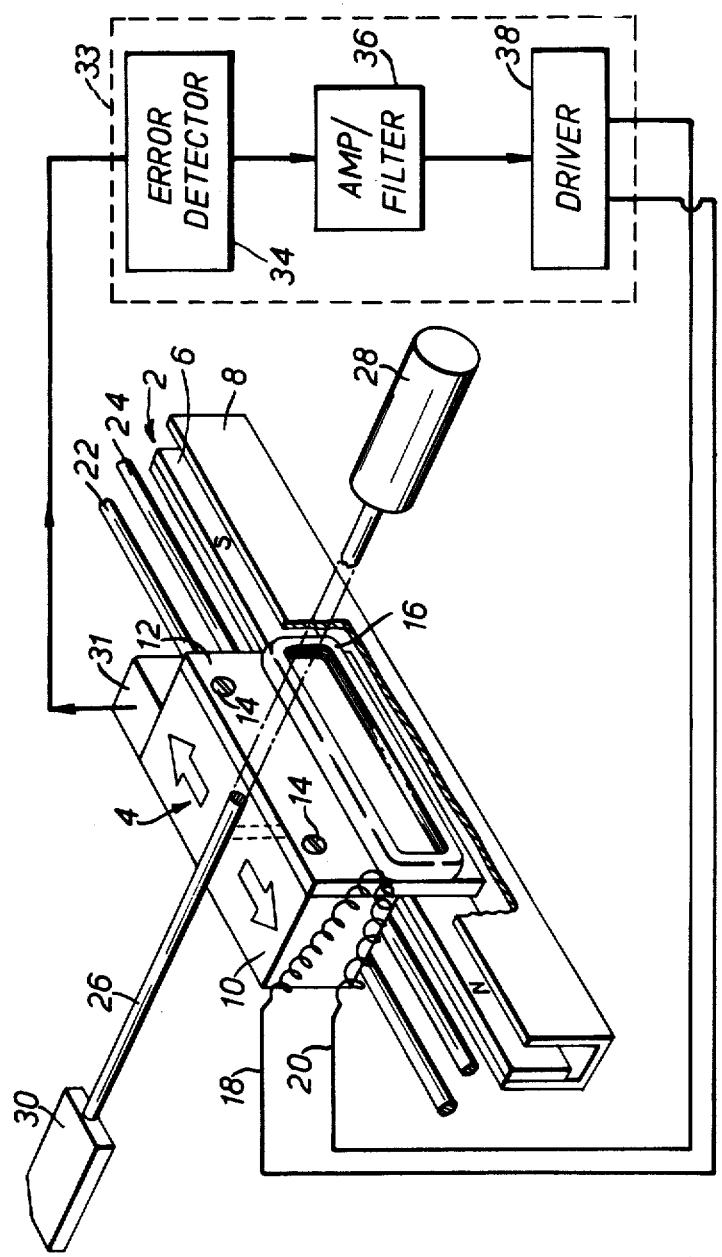
FIG. 1 shows part of a disc record player in which a linear motor effects tangential tracking of a pick up arm.

Referring to FIG. 1 the motor 2 comprises a movable carriage 4 which is adapted to move with respect to a fixed linear magnet 6. The magnet 6 is in the form of a magnetic rubber strip having North and South poles as illustrated. The magnet 6 is adhered to a channel member 8. The carriage 4 is provided with a body part 10 and downwardly depending leg 12 which is secured to the body part 10 by means of screws 14. The leg 12 is provided with an energising coil 16 which is energised by means of leads 18, 20.

The carriage 4 is adapted to move along the guide rails 22, 24 so that the leg 12 and the coil 16 move adjacent the magnet 6 up and down in the channel of the channel member 8. A pick up arm 26 is pivoted on top of the body part 10 of the carriage and, as shown, the pick up arm 16 includes a counter balance weight 28 and a pick up head 30. The pick up arm 26 is adapted to the position for substantially tangential tracking across a disc record.

In operation the pick up arm 26 tracks across a disc record (not shown) and during this tracking it will be moved off its tangential tracking position. This movement of the pick up arm 26 off its tangential tracking position is sensed by a device 31 which is effective to generate an appropriate electric current for the coil 16. Depending on the polarity of this current, it will produce a force F, which will cause the carriage to move either to the left or to the right. The total force (F) due to a current I in a coil 16 of N turns, and situated in a field of flux density B is defined as F equals 2BILN where L is the active length of conductor. The number 2 appears since both sides of the coil are situated in the field B. The carriage 4 will this be caused to move in the appropriate direction to follow the movement of the pick up arm 26 and to restore the pick up arm 26 to its desired tangential tracking position.

An error detector in accordance with our British Pat. No. 1361610 is provided and comprises an oscillator and two sensing coils (neither shown). The error signal from the two sensing coils is processed on an electronics circuitry board 33. The error signal is processed in the error detector circuitry 34, amplifier and filter 36, and the driver stage 38 which provides current in the appropriate direction via leads 18, 20 to drive the coil 16 in the corrective sense.

Figure 2:
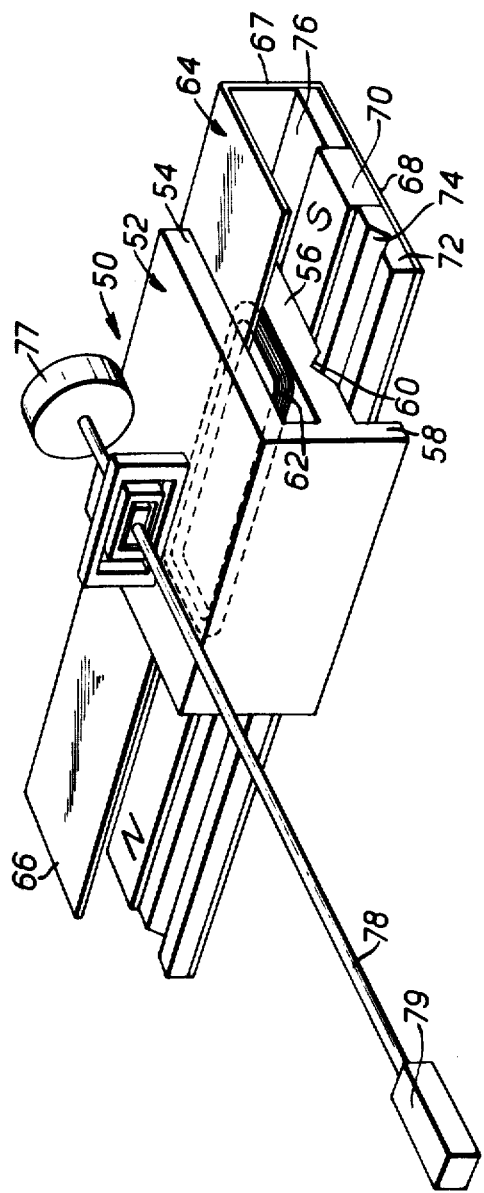
FIG. 2 shows a motor generally similar to that of FIG. 1 but having an alternative carriage arrangement.

Referring now to FIG. 2 the linear motor 50 illustrated comprises a movable carriage 52 which is constructed as shown to have two parallel arms 54, 56 and a downwardly depending leg 58. Formed in the arms 56 are two V-shaped grooves, only one of which is shown at 60. Secured in the arm 56 is an energising coil 62.

The carriage 52 interacts as shown with a housing 64. The housing 64 has an upper arm 66 which projects between the arms 54, 56 of the carriage 52. The housing 64 also has a lower arm 68 which supports a magnet 70 having North and South poles as shown, and a guide member 72 provided with a V-shaped groove. The U-shaped path 66, 67, 68 is made of mild steel and provides a magnetic return path so that there is a reasonably uniform flux density across the gap between arms 66 and 68.

Two ball-bearings (not shown) seat in the grooves 60, 74 and locate the carriage 52 with respect to the housing 64 and also enable the carriage 52 to slide with respect to the housing 64. The ball-bearings move half the distance moved by the carriage 52. Two further ball-bearings (not shown) are located in the other groove (not shown) in the arm 56 of the carriage 52, and these two ball-bearings run on the surface 76 of the housing 64. The front two ball-bearings locate the carriage 52 and prevent movement of the carriage 52 at right angles to the direction of traverse. The rear two ball-bearings are used to support the carriage 52. A total of only 3 ball-bearings may be utilised if desired.

The circuitry for enabling tracking of a pick up arm may be shown in FIG. 1 and the error sensor can be as shown in our U.S. Pat. No. 1,361,610. The pick up arm 78 has a counterbalance weight 77 and a pick up head 79 and when it tracks across the record and moves from its tangential tracking position, the coil 62 is appropriately energised to produce a force (F) which will cause the carriage 52 to move either to the left or to the right with respect to the housing 64, and thus restore the pick up arm 78 to its tangential tracking position.

Figure 3:
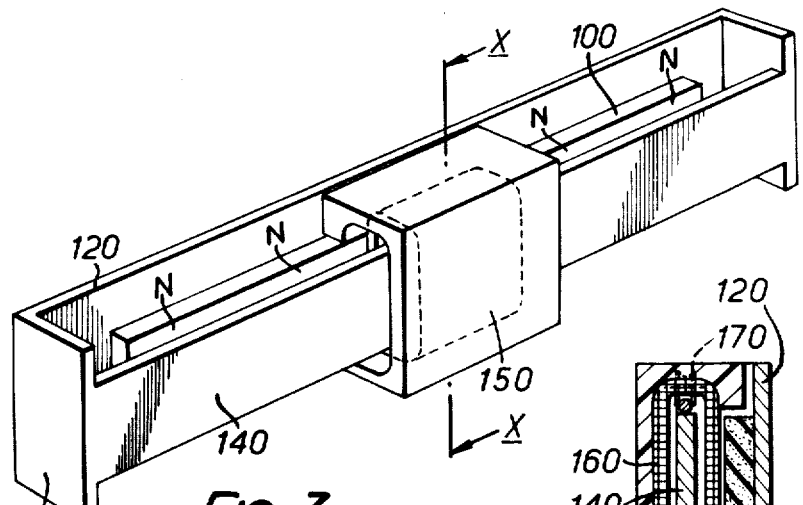
FIG. 3 shows an alternative embodiment of linear motor.
Figure 4:
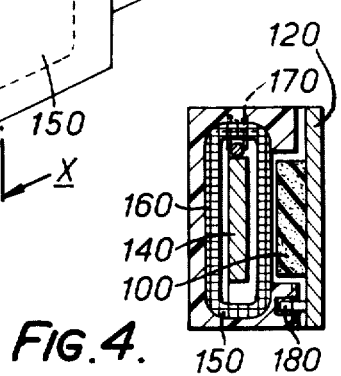
FIG. 4 is a cross sectional view of the lines X—X of the motor of FIG. 1.

In the embodiments of FIGS. 1 and 2 the length of the strip magnet needs to be at least twice the length of movement of the coil and thus of the carriage, and for application in some disc record players this can be undesirably excessive. This disadvantage is mitigated in the arrangement shown in FIGS. 3 and 4 of the accompanying drawings. In FIGS. 3 and 4 there is shown a linear electric motor in which the length of the strip magnet is only slightly longer than the desired length of travel of the coil which coacts with it. The motor consists of a strip magnet 100 which is polarised "North" in the embodiment shown along the whole of its length and which is carried on the inside surface of one major limb 120 of a generally rectangular, annular magnetisable (e.g. steel) carrier member 130 which also serves as a return path for the strip magnet 100. Around the other major limb 140 of the carrier member 130 is disposed a tubular coil 150 which is affixed to a carriage 160 which is supported on the limb 140 by means of a pair of rollers or wheels, one of which is shown at 170 in FIG. 4, a further roller or wheel 180 beong provided which runs along a vertical extension (FIG. 4) of the limb 120 of the carrier member 130. When the coil 150 is energised, it will set up a magnetic field which will react with that of the strip magnet 100 to cause the coil 150 and thus the carriage 160 to be moved along the limb 140 in the direction which depends on the polarity of energisation of the coil 150, but in this case since only one limb of the coil 150 is reacting with the strip magnet 100, this need only be just in excess of the required movement of the carriage 160. This provides a consequential saving in space.

Figure 5:
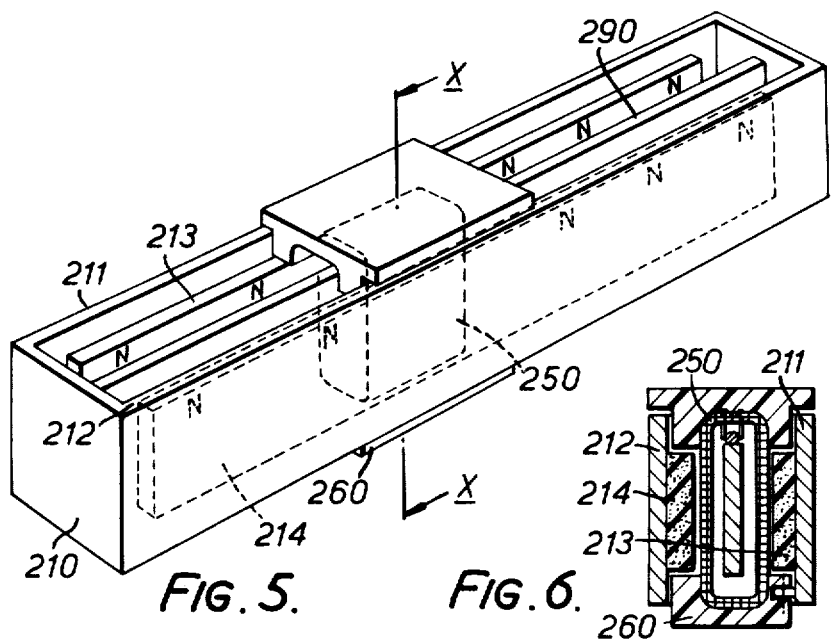
FIG. 5 depicts an electric motor which is a modification of that shown in FIG. 3.
Figure 6:
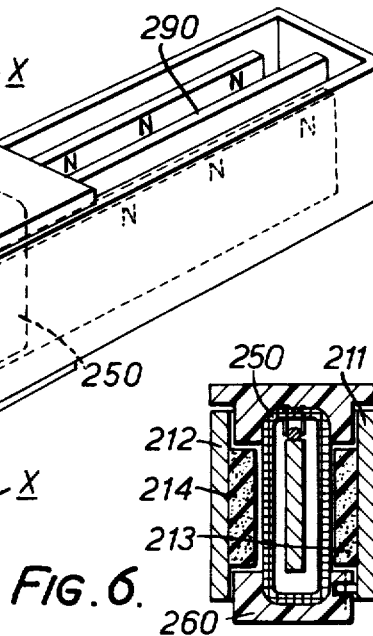
FIG. 6 is a cross sectional view on the lines X—X of FIG. 5.

In the arrangement of FIGS. 3 and 4, the force developed is only half that produced in the arrangement of FIGS. 1 and 2 for the same energising current, that is F equals BILN rather than 2BILN but this can be overcome by making use of two strip magnets which coact with respective sides of the coil 150 as shown in FIGS. 5 and 6.

In FIGS. 5 and 6 a coil 250 is affixed to a carriage 260 disposed around a centre limb 290 of a generally rectangular elongated 'figure-of-eight' shaped magnetisable carrier member 210, the two other major limbs 211 and 212 of which, are provided on their inside surfaces, with strip magnets 213 and 214 respectively which are both polarised "North" on the whole of their length. In this arrangement two sides of the coil 250 react with one or other of the two strip magnets 213 and 214 to effectively double the force produced (i.e. 2BILN) compared with that of the arrangement of FIGS. 1 and 2.

Referring now to FIG. 7(a) and (b), the linear motor shown comprises a base plate 600 which carries a rectangular annulus 601 formed of magnetisable material (e.g. steel) having opposed main members 602 and 603. The member 603 carried on its inside surface facing the member 602 a magnet 604 formed from magnetic rubber strip poled "North" along its entire length.

A motor carriage 605 is spaced from and bridges the member 602 of the annulus 601 and carries on an outer mounting surface 606 a pick up arm assembly 628 and from an under surface 607 a coil 608 which extends around the member 602. The carriage 605 has three wheels which include two wheels 609 having V-grooved outer rims and a third wheel 610 having a flat outer rim. The wheels 609 run along a guide rod 611 which is arranged generally parallel to and alongside the annulus 601 and is supported from the base plate by means of support blocks 612. The wheel 610 runs along a second guide rod 613 arranged parallel to the rod 611 on the opposite side of the annulus 601 and supported from the base plate by support blocks 614.

The wheel 610 has a central axle 615 which is supported between a pair of bearing members 616 shown enlarged in one of the two inset sketches. As can be seen in the sketch, the bearing member 616 consists of a length of cylindrical rod in which is cut a longitudinal V-groove along almost its entire length but leaving a blank end 618. The wheels 609 also have a central axle 619 which is supported between a pair of bearing members 616 and 617. The bearing 616 is provided on the inside, that is the motor side of the wheel and is identical in form to the bearings 616 which support the wheel 610. The bearing 617 is shown in enlarged view in the other inset sketch and consists of a length of cylindrical rod with a V-groove cut along the whole length. Both the bearings 616 and 617 are manufactured from a material known as DQ1 manufactured by the firm of Glacier.

The motor is mounted in the record player with the base plate 60 inclined at an angle of 4° so that the wheels 609 are slightly below the wheel 610. The carriage 605 is thus urged towards the wheel 609 and the blank end surface 618 of the bearing 616 of the wheel 609 is urged against the axle 619 to provide a positive location of the V-groove of the wheel 609 against the guide rod 611. The position and line of movement of the carriage 605 is thus determined by the two V-grooved wheels 609 on the guide rod 611 and the wheel. The wheel 610 may in view of having a flat end rim tend to move across the rod 613 and the blank end faces of the bearings 616 which support the wheel 610 act to restrict the sideways movement of this wheel.

Extending from the under surface 607 of the carriage 605 is a potentiometer 620 which is arranged to run along a carbon track 621 supported from the base plate 600 on a member 622 and running parallel to the guide rod 611. The wiper 620 and carbon track 621 provide electrical signals representative of the position of the carriage 605 along the guide rods 611 and 613 and these signals are used in a manner to be described with reference to FIG. 8 for controlling the linear electric motor.

Referring now to FIG. 8 the motor carriage is illustrated at 605 and this carriage provides via the potentiometer wiper 620 and carbon track 621 an electrical signal on line 627 which is fed to a first differentiating circuit 623. The differentiating circuit 623 differentiates the input electrical signal and passes this to a second differentiation circuit 624 and to point 625. The differentiation circuit 624 differentiates the electrical signals provided from the differentiation circuit 623 and passes these signals to a point 625 where they are combined with the said signals fed thereto from the differentiation circuit 623.

The signals provided by the differentiation circuit 623 are representative of the velocity of movement of the motor carriage 605 and the signals provided by the differentiation circuit 624 are representative of the acceleration of the carriage and the combined velocity and acceleration signals are fed to an amplifier/filter/driver arrangement 626 and thence as a feed back control signal to the coil 608 of the linear motor. By providing both acceleration and velocity representative feed back control of the linear motor the movement of the carriage 605 can be controlled very accurately and can be made to be very smooth. Whilst it is preferred to use both velocity and acceleration representative signals for controlling movement of the carriage 605 either one or other can be used alone.

What is claimed is:

1. A disc record player including a pickup arm for tracking a disc record, said record player comprising feedback means responsive to at least one of velocity and acceleration of the pickup arm for producing a motor control signal, and means including a linear type electric actuating motor responsive to said motor control signal for causing said pickup arm to tangentially track said record.

2. A disc record player as claimed in claim 1 in which the feedback means is responsive to both said velocity and acceleration of said pickup arm to provide the motor control signal.

3. A disc record player as claimed in claim 1 in which the feed back means for providing the motor control comprises electrical position responsive means for providing a signal representative of a position of the pick up arm and differentiation means for differentiating the signal provided by the position responsive means.

4. A disc record player as claimed in claim 3 in which the electrical position responsive means is a wiper movable along a resistive track.

5. A disc record player as claimed in claim 1 in which the motor comprises movable coil means for moving along a path adjacent strip magnet means arranged between opposed magnetisable members which are magnetically linked at least part of the coil means being disposed between the strip magnet means and one of the magnetisable members so that when energised relative movement between the coil means and the strip magnet means is obtained.

6. A disc record player as claimed in claim 5 in which the strip magnet means has similarly poled ends and the coil means includes at least one turn arranged around one of the members.

7. A disc record player as claimed in claim 5 in which the strip magnet means is magnetic rubber strip.

8. A disc record player as claimed in claim 5 in which the coil means is carried by a movable carriage upon which the pick up arm is mounted.

9. A disc record player as claimed in claim 8 in which the movable carriage is provided with wheels which run on guide rods.

10. A disc record player as claimed in claim 9 in which at least one wheel has a grooved rim which engages a respective guide rod.

11. A disc record player as claimed in claim 9 in which each wheel has a central axle which is supported by a pair of bearing members each having a generally V-shaped cut out portion to accommodate the axle.

12. A disc record player including a pickup arm for tracking a disc record, said record player comprising feedback means, responsive to at least one of the velocity or acceleration of said pickup arm, for producing a motor control signal, and means including a linear type electric motor, responsive to said motor control signal, for causing said pickup arm to tangentially track said record, the motor comprising a pair of opposed magnetizable members which are magnetically linked, a strip magnet arranged between the members and carried by one of them, said magnet having opposite ends of the same polarity, coil means provided around one of the opposed members, a wheeled carriage arranged to bridge the pair of members and to carry upon opposite surface portions the coil means and the pickup arm, a pair of wheels mounted on the carriage and having grooved rims arranged to engage a first guide rod positioned to one side of the pair of members, a third wheel mounted on the carriage opposed to the pair of wheels and arranged to run along a second guide rod positioned to a side of the pair of members opposite to the said one side.

13. A disc record player as claimed in claim 12 in which each of said pair of wheels and the said third wheel has a central axle supported by a pair of bearing members each having a V-shaped cut out portion to accommodate the axle.

14. A disc record player as claimed in claim 12 in which the feed back means includes potentiometer means formed by a resistive track positioned substantially parallel to the first and second guide rods and a wiper extending from the carriage to contact the track, the potentiometer means providing a signal representative of the position of the carriage and there is provided differentiation means for differentiating the said signal.

* * * * *